United States Patent [19]
Dalton

[11] Patent Number: 5,581,885
[45] Date of Patent: Dec. 10, 1996

[54] TOOL FOR PREPARING CABLE ENDS

[75] Inventor: Trevor R. Dalton, Belvedere, England

[73] Assignee: BICC Public Limited Company, London, England

[21] Appl. No.: 357,185

[22] Filed: Dec. 13, 1994

[51] Int. Cl.⁶ .................................................... H02G 1/12
[52] U.S. Cl. .................................................... 30/90.1
[58] Field of Search .................................. 30/90.1, 90.8, 30/91.1, 95; 81/9.4, 9.41, 9.42, 9.43, 9.44

[56] References Cited

U.S. PATENT DOCUMENTS

| | | |
|---|---|---|
| 4,059,893 | 11/1977 | Solury . |
| 4,594,029 | 6/1986 | Michael, III . |
| 4,932,091 | 6/1990 | Krzyzanski ........................ 30/90.1 X |
| 5,471,744 | 12/1995 | Simmering ........................ 30/90.1 |

Primary Examiner—Douglas D. Watts
Attorney, Agent, or Firm—Oliff & Berridge

[57] ABSTRACT

A tool for stripping semiconducting insulation shield from an end part of a high-voltage cable in preparation for jointing or termination and at the same time circularising it has an annular body carrying a stripping blade and means (such as a handle or a motor drive) for rotating the body around a cable end extending through it to strip a surface layer from the cable end in a generally helical manner. So that the movement of the blade follows the general cylindrical shape of the cable end and is not significantly influenced by minor local departures from nominal dimensions, the annular body is mounted on the cable end by means of a plurality of resilient rings, for example located by grooves in its inner surface or in the inner surface of a second, non-rotating, annular body coupled to it. The tool can also be used to strip insulation and optionally also conductor shield from another end portion of the cable.

14 Claims, 7 Drawing Sheets

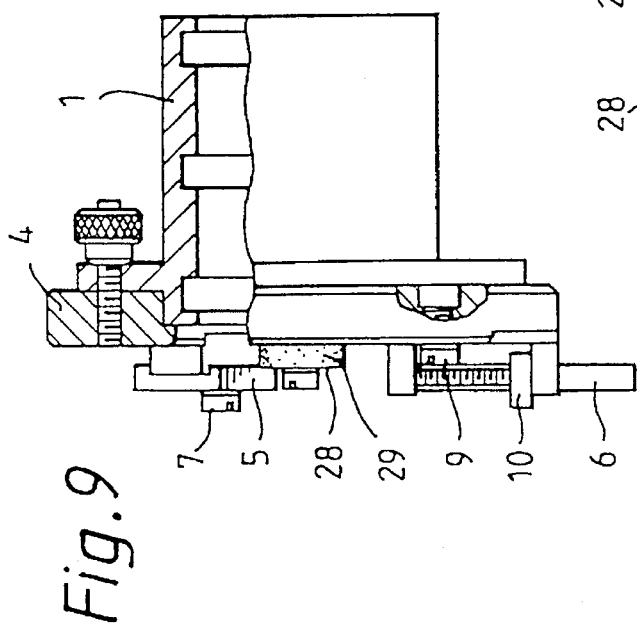
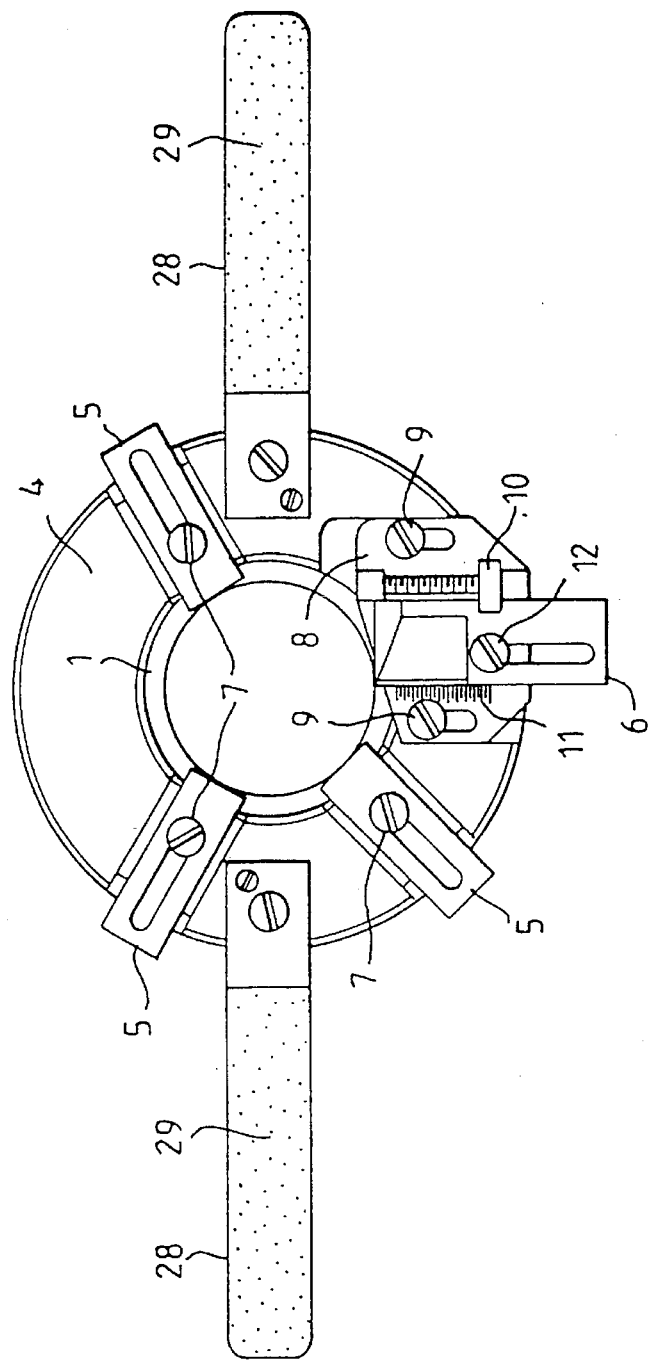

TOOL FOR PREPARING CABLE ENDS

BACKGROUND OF THE INVENTION

1. Field of the Invention

This invention relates to a tool for stripping semiconducting insulation shield, and insulation if required, from an end part of a "polymeric" (as distinguished from paper-insulated) high-voltage cable in preparation for jointing or termination. For avoidance of doubt, any cable with at least one core of circular cross-section having a conductor shield and an insulation shield is to be considered a "high voltage" cable for the purposes of this invention.

The insulation of such cables is a large-section extrusion, and whereas its outer surface is nominally circular, minor inaccuracies in shape and dimension occur; these are of no significance in relation to the electrical function of the cable, provided that the surface is smooth and the radial thickness everywhere sufficient. However, in making joints and terminations, it is often necessary to use molded or otherwise preformed components that will not conform to such minor inaccuracies, and the part of the insulation from which the insulation shield has been removed needs to be cut to an accurately circular shape to avoid risk of electrical stress concentrations occuring locally in places between the exposed insulation and the preformed body.

2. Related Art

One known type of tool for stripping the insulation shield from such cables comprises an annular body carrying a stripping blade and means (such as a handle or a motor drive) for rotating the body around an end part of a cable extending through it to strip a surface layer from the cable in a generally helical manner. Such known tools do not generate a sufficiently circular stripped surface, because they are too much influenced by the precise radial dimensions of the cable at the position of the blade and at a place directly opposite it.

SUMMARY OF THE INVENTION

It is an object of the invention to provide a tool that will strip insulation shield from such a cable and at the same time circularise it ready for engagement with a preformed body in the joint or termination; preferred tools in accordance with the invention can also be used to strip insulation from a different part of the cable to expose the conductor shield or the conductor, avoiding the need for a second tool.

In accordance with the invention, a tool for stripping semiconducting insulation shield from an end part of a high-voltage cable (in preparation for jointing or termination) and at the same time circularising it has an annular body carrying a stripping blade and means for rotating the body around a cable end extending through it to strip a surface layer from the cable in a generally helical manner and is characterised in that the annular body is mounted on the cable by means of a plurality of resilient rings, so that the movement of the blade follows the general cylindrical shape of the cable end and is not significantly influenced by minor local departures from nominal dimensions.

The resilient rings may be directly mounted in said annular body, or they may be mounted in a second annular body coupled to it in a manner permitting relative rotation around the common axis of the two annular bodies, in which case it is intended that the second annular body and the rings do not rotate.

Preferably the resilient rings are located between pairs of abutment surfaces formed in the inner surface of the respective annular body, for example the sidewalls of a groove or the facing walls of two upstanding ribs. At least when this is done, the resilient rings may be formed by flexible strips of appropriate material bent into place, without necessarily joining the ends of the strip in any way.

The resilient rings may be of any appropriate cross-section: for example they may have a solid or hollow circular section (O-rings) or they may be oval, rectangular or of "V" or "X" section. They may be made of a suitable rubber or other polymeric material, the prime considerations being (a) freedom from any ingredients that might migrate into the cable insulation and degrade its properties, (b) an appropriate degree of elastic resilience and (c) ability to slide on the cable surface without sticking. Rings of vinylidene fluoride/hexafluoropropylene copolymer elastomer (sold under the trademark VITON), of nitrile rubber, of polychloroprene, of butyl rubber, of polytetrafluoroethylene or of an appropriate polyurethane are considered suitable.

The tool needs to be a close fit on the cable, and it will normally be necessary to provide a range of interchangeable rings to accomodate different sizes of cable and in at least some cases diameter tolerances in cable manufacture. Fine adjustment can be achieved by an adjustable mounting for the rings in many cases (depending on the resilience of the rings and whether they are complete rings or are formed by strips with unconnected and actually or potentially gapped ends).

Since the exposed cable insulation needs to be acurately dimensioned, the blade will normally need to be adjustable. Preferably it is adjustable by a screw and fitted with a vernier scale for accurate setting; alternatively a scaled micrometer screw could be used. If desired, it may be adjustable to the extent required to enable it to strip insulation and conductor shield when required.

The use of resilient rings does not preclude the provision of abutments ("dummy blades") in or close to the plane of rotation of the cutting tool.

BRIEF DESCRIPTION OF THE DRAWINGS

The invention will be further described, by way of example, with reference to the accompanying drawings in which:

FIGS. 9 and 10 are views, corresponding to FIGS. 1 and 2 respectively, of a second modified hand tool in accordance with the invention.

DESCRIPTION OF THE PREFERRED EMBODIMENTS

Figure 1:
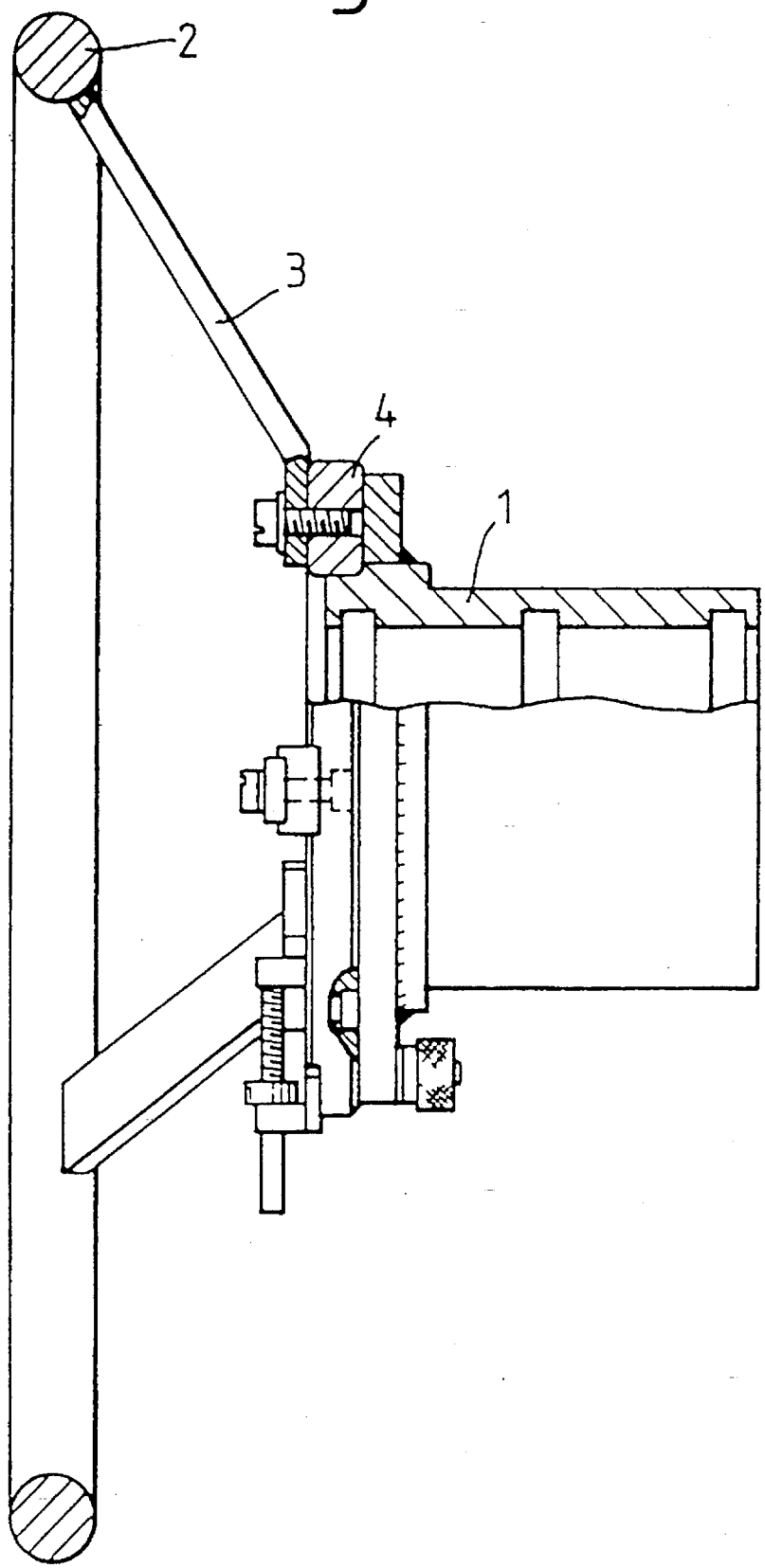
FIGS. 1 and 2 are mutually perpendicular views of one form of hand-operated tool in accordance with the invention (FIG. 1 being partly sectioned)

The tool of FIGS. 1–4 comprises an annular body 1 through which an end part of a cable (not shown) may extend, entering from the right as seen in FIG. 1. The annular body is connected to an annular operating handle 2 by spokes 3, handle and spokes together constituting a wheel. The front of the annular body is formed by a separate ring 4, which can be transferred to alternative rear parts with different dimensions suited to different ranges of cable diameter; on the front of this separate ring 4 are mounted three abutments 5 (sometimes called "dummy blades") and a blade 6. All of these are adjustable in a radial direction and are shown in fully retracted and inoperable positions. The abutments 5 are slidable and are locked in adjusted positions by clamping screws 7; in use, they are to be set at a radius corresponding to the maximum external radius of the insulation shield of the cable end to be prepared. The blade 6 needs to be set with greater precision and is therefore mounted in an adjustable slide 8 which locks with two clamping screws 9 and is additionally fitted with an adjusting screw 10, a vernier setting scale 11 and a clamping screw 12. The blade is set to the required radius of the stripped insulation, as determined by the preformed component to be fitted. The shape of the blade 6 is best understood from FIG. 3; it provides two cutting edges at right angles to one another, the first edge 13 to cut peripherally underneath the shield layer to be stripped and the second edge 14 to cut radially between the strip of the shield layer being removed and the remainder of the layer remaining on the cable at least until the next turn of the tool.

In accordance with the invention, the annular body 1 (best seen in FIG. 4) is not dimensioned to fit closely on the cable: instead it is formed with a substantial clearance and has grooves 15 machined into its bore. These receive O-rings 16, or other resilient rings, which engage the surface of the cable to position the tool according to an average radius at the longitudinal position of each ring and not according to the local radii at the three points under the abutments 5.

In use, the end part of the cable (previously stripped back to expose the semiconducting insulation shield) is inserted into the tool which is carefully rotated by hand under minimal axial pressure, so that the action of the cutting blade determines the rate of axial advance to pare a helical strip from the cable end. When the required length has been stripped, the tool is removed and the exposed end of the cut-back shield is trimmed by hand in the usual way.

In a particular example in accordance with these drawings which has given good results, the nominal radius of the cable end over the semiconducting insulation shield was 71 mm; the internal diameter of the annular body was 74 mm and the grooves 15 therein were 8.0 mm wide and 4.0 mm deep. Into these were fitted rings formed from 220 mm lengths of 6 mm diameter round cord of VITON fluoroelastomer with a Shore hardness of 60° to 90°. This enabled a crosslinked polyethylene insulated high voltage cable core in which the local radius varied by ±1 mm from the nominal radius to be stripped and circularised in one operation to give a stripped end with a radius of 67.25±0.05 mm.

Figure 5:
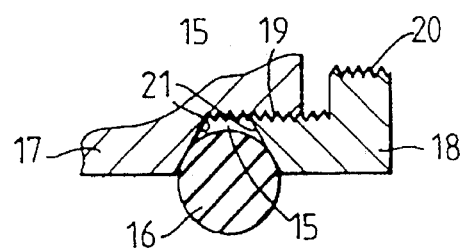
FIG. 5 is a detail showing a modification to the tool of FIGS. 1–4.

As so far described, adjustments to match the actual diameter of the cable must be made by exchanging the resilient rings 16 for ones with appropriately different dimensions. To reduce the need to stock large numbers of resilient rings, the tool may be modified to allow limited adjustment to the effective diameters of the rings. One way of doing so is illustrated by FIG. 5, which shows one of the grooves 15 formed in a composite annular body including a major member 17 and a minor member 18 in the form of a ring connected to the major member 17 by a screw thread 19. A knurled face 20 facilitates adjustment, or formations for engaging a spanner or other tool could be provided. Each of the members 17, 18 has a tapered face 21 which forms one of the sides of the groove 15. By screwing the members 17,18 towards one another, the width of the groove can be reduced and the ring 16 urged radially inwards, towards the axis of the tool; screwing in the opposite direction increases the effective diameter. It will be apparent that the range of adjustment available will be greater if the ring is formed by a strip with its ends not connected together.

Figure 6:
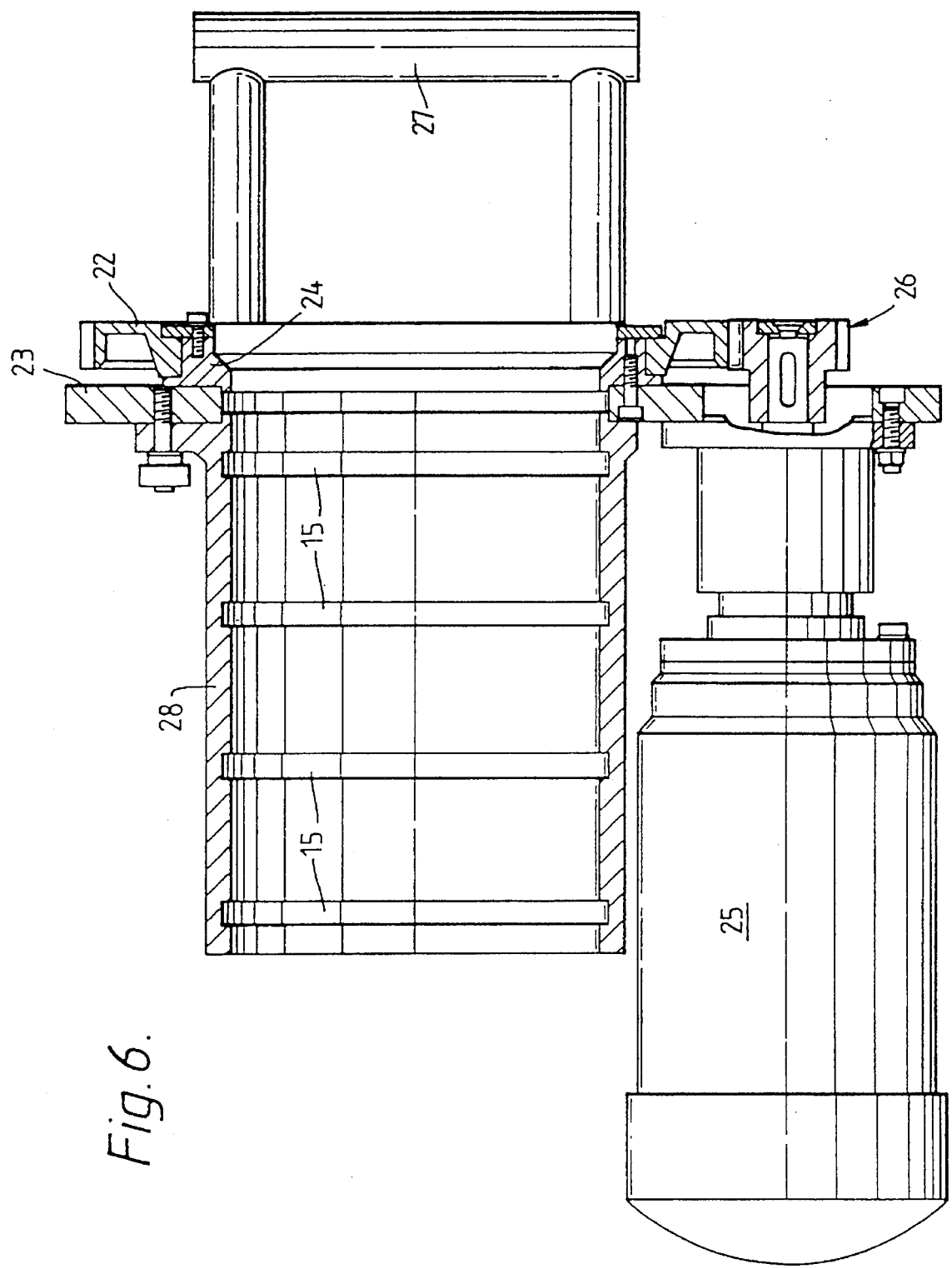
FIG. 6 is a view, corresponding broadly to FIG. 1, of an electrically powered tool in accordance with the invention.

FIG. 6 shows a power-operated tool in accordance with the invention which incorporates a number of modifications from the tool of FIGS. 1–4. The most significant is that the rotatable annular body is constituted by an annular gearwheel 22 on the front (right-hand as seen) of which the blades and abutment members (not shown) are mounted; the remainder of the tool advances axially along the cable without rotating. The gearwheel 22 is mounted from a non-rotating disc 23 by a bearing ring 24. This disc 23 (which is non-circular) also supports (a) a mounting for a motor 25 (which may be electric, pneumatic or hydraulic, depending on the available power supplies) which drives the gearwheel 22 through any suitable gearing 26 (shown as meshing gears, but plain or toothed belts, chains or the like could be used);

(b) a handle 27, which is screwed to the disc in a position behind the plane of the figure and behind the gearwheel; and (c) an auxiliary annular member 28 in which are the grooves 15 for receiving the resilient rings (not shown).

With this particular handle arrangement, the tool is suitably operated with the right hand on the handle and the left hand on the housing of the motor 25; many other handle arrangements could be chosen.

Figure 2:
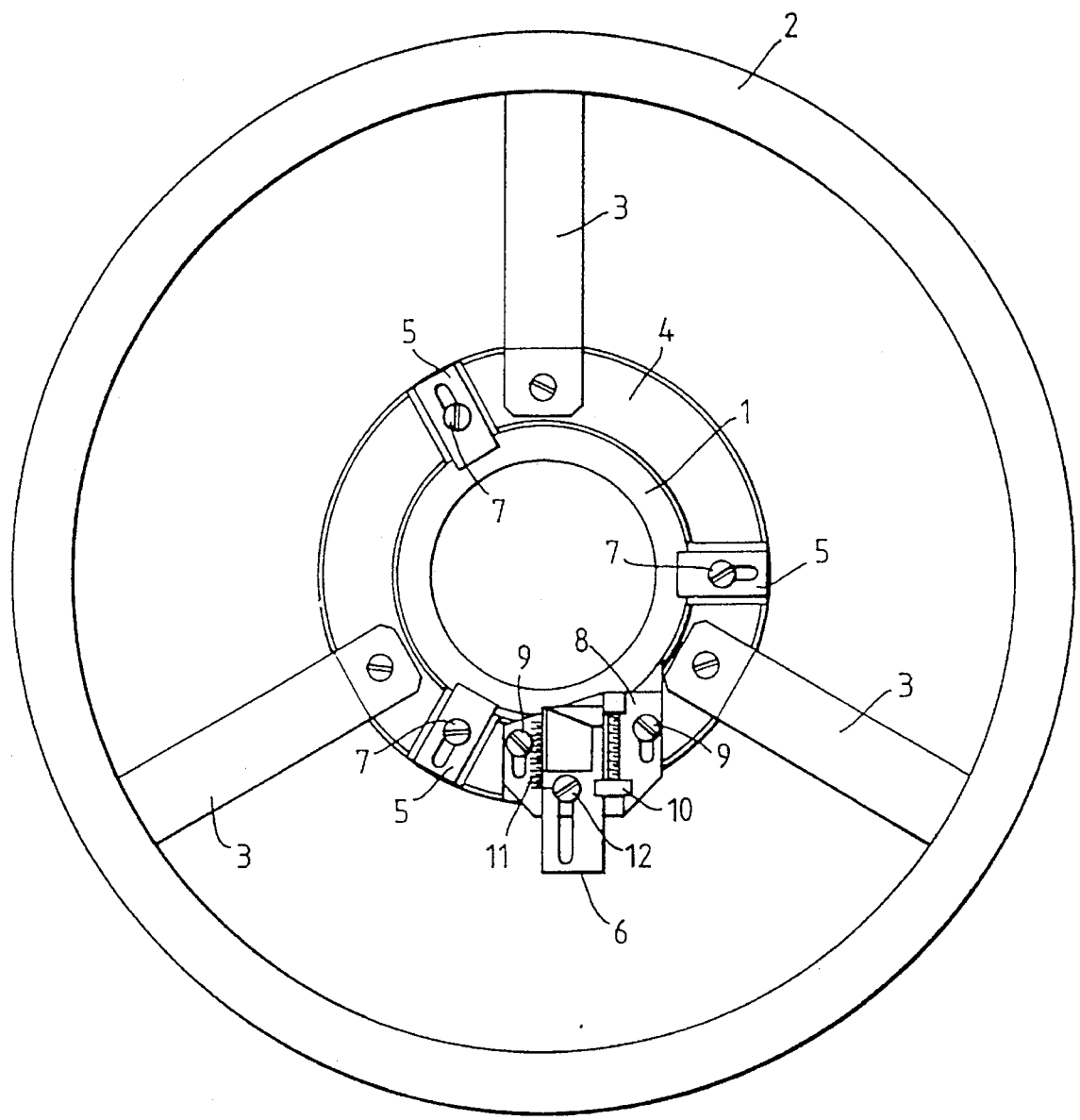
Figure 3:
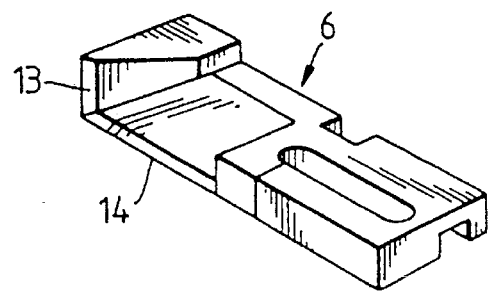
FIG. 3 is a cross-section through an annular body forming a major part of the tool.
Figure 4:
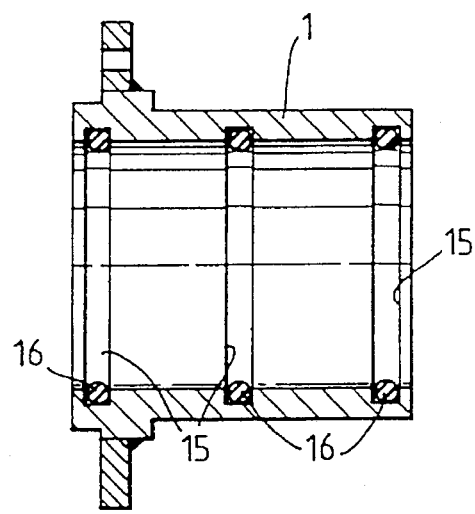
FIG. 4 is an enlarged detail of the blade used in this tool.
Figure 7:
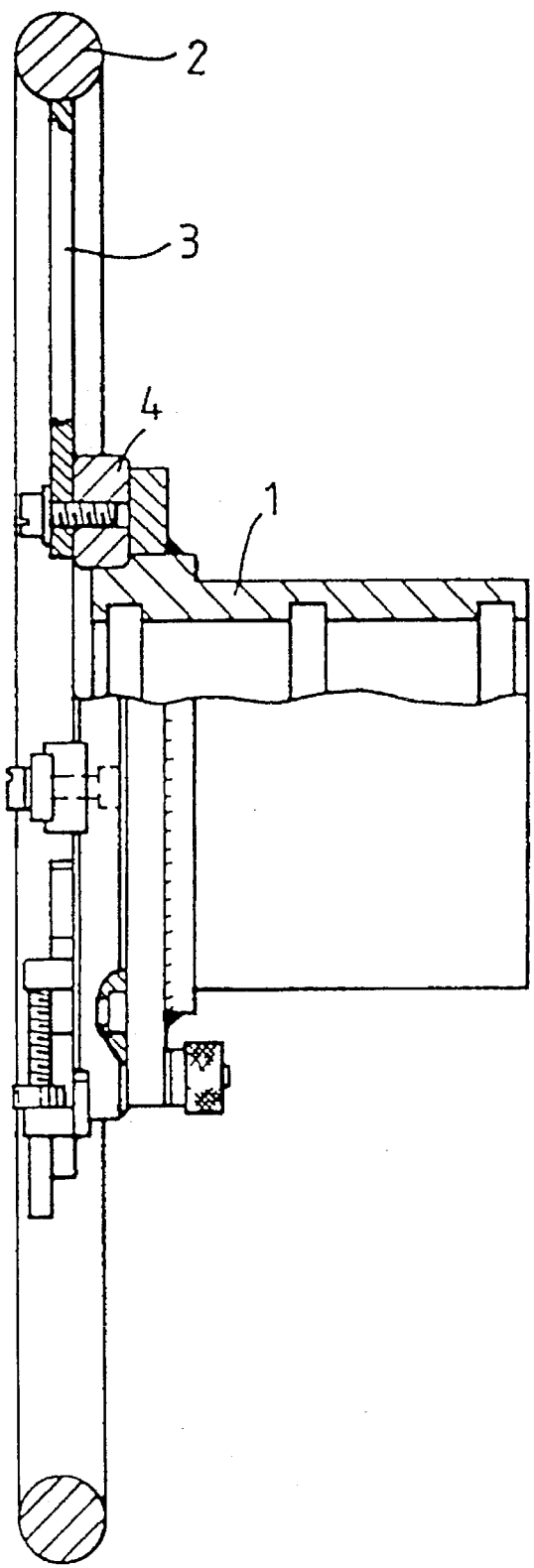
FIGS. 7 and 8 are views, corresponding to FIGS. 1 and 2 respectively, of a first modified hand tool in accordance with the invention.
Figure 8:
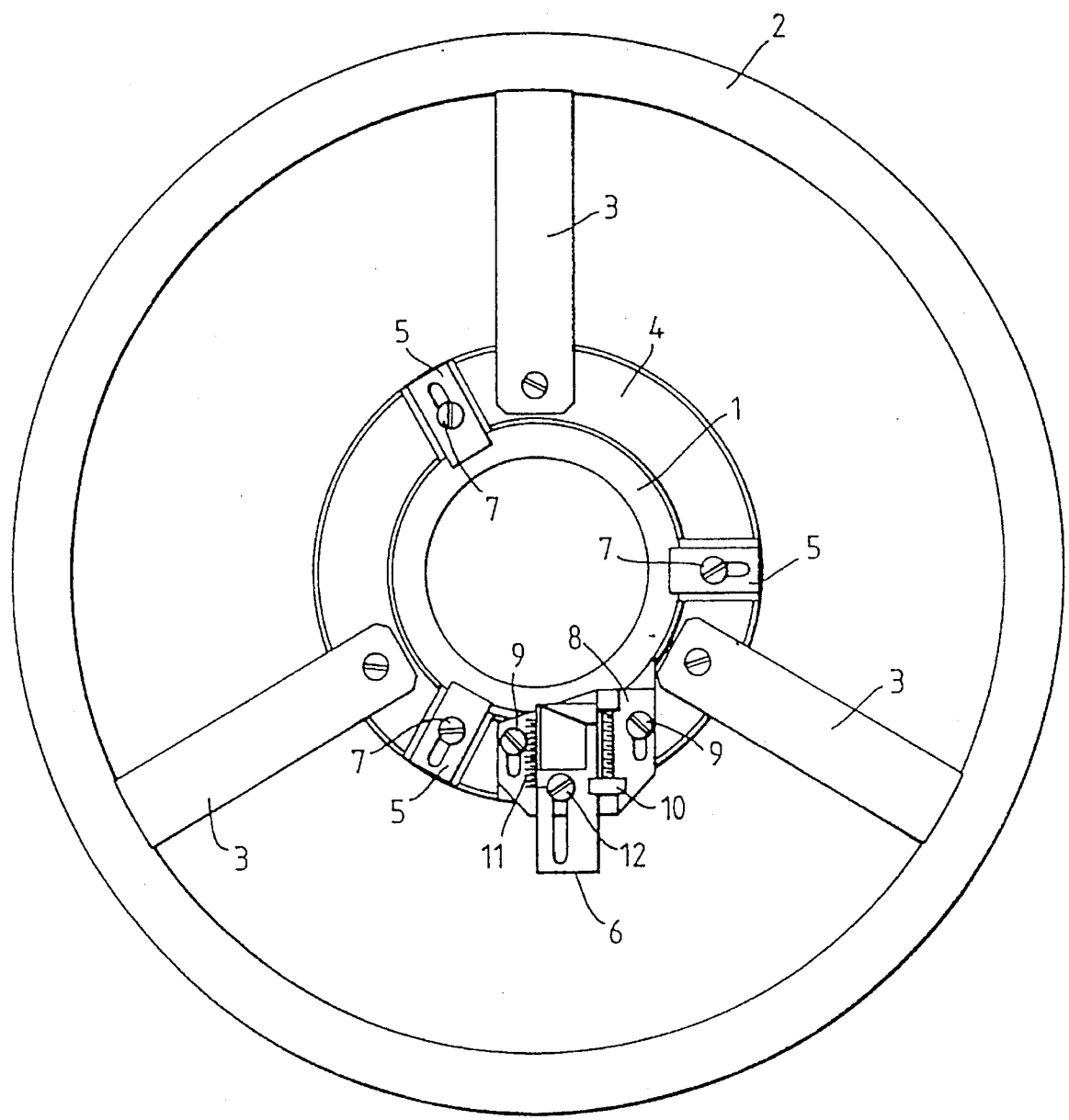

FIGS. 7 and 8 show a first modified hand tool in accordance with the invention; it differs from the one shown in FIGS. 1 and 2 only in having a flat wheel (ring 2 and spokes 3) instead of a dished one.

FIGS. 9 and 10 show a second modified hand tool in accordance with the invention; it differs form the ones shown respectively in FIGS. 1 and 2 and in FIGS. 7 and 8 in having a pair of straight bar handles 28, each with a plastic coating 29, instead of the wheel-style handle of the hand tools previously described.

The tools described can be used in the jointing of cables with insulation of low- or high-density thermoplastic polyethylene, of crosslinked polyethylene, of ethylene-propylene copolymer and terpolymer rubbers and of other suitable polymers.

I claim:

1. A tool for stripping an end part of a high-voltage cable having a metallic conductor, insulation enclosing said conductor and a semiconducting insulation shield covering the outer surface of said insulation to form a nominally circular core, the tool comprising:

a plurality of resilient rings to fit over said shield;

an assembly fitting on and supporting said resilient rings, said assembly comprising a first annular body coaxial with said resilient rings and means for rotating said first annular body about an axis of said resilient rings; and an angled cutting blade projecting inwardly from the assembly to engage and remove said shield when said first annular body is rotated.

2. A tool as claimed in claim 10, wherein said first annular body further comprises a plurality of recesses formed in an inner surface of said first annular body, each recess receiving one of said resilient rings.

3. A tool as claimed in claim 2 in which said resilient rings are located between pairs of abutment surfaces formed in the inner surface of said first annular body.

4. A tool as claimed in claim 3 in which said resilient rings are formed by flexible strips with unjoined ends.

5. A tool as claimed in claim 1, said assembly further comprising:

a second annular body, said second annular body fitting on and supporting said resilient rings;

mounting means for mounting said second annular body to said first annular body to allow relative rotation between said second annular body and said first annular body around said axis of said resilient rings.

6. A tool as claimed in claim 5 in which said resilient rings are located between pairs of abutment surfaces formed in an inner surface of the said second annular body.

7. A tool as claimed in claim 6 in which said resilient rings are formed by flexible strips with unjoined ends.

8. A tool as claimed in claim 1 in which said rings are made of a polymer selected from the group consisting of vinylidene fluoride/hexafluoropropylene copolymer elastomer, nitrile rubber, polychloroprene, butyl rubber, polytetrafluoroethylene and polyurethene.

9. A tool as claimed in claim 1, further comprising an adjustable mounting device further supporting said resilient rings.

10. A tool as claimed in claim 1, wherein said means for rotating said first annular body is one of a wheel handle, a flat wheel handle and a bar handle.

11. A tool according to claim 1, wherein said angled cutting blade further comprises:

a first cutting edge to cut radially between a strip of the shield being removed and a remainder of the shield remaining on the cable; and a second cutting edge at a right angle to said first cutting edge, said second cutting edge cutting peripherally underneath the shield being removed.

12. The tool as claimed in claim 1, wherein said first annular body fits on and supports said resilient rings.

13. The tool as claimed in claim 1, wherein said cutting blade travels a generally helical path based on an average radius of said resilient rings.

14. The tool as claimed in claim 1, wherein said rotating means includes a non-rotating disk, a motor attached to said non-rotating disk and a gear system connecting said motor to said first annular body, said motor rotating said first annular body around said axis of said resilient rings to drive said cutting blade around a path based on the average radius of said resilient rings.

* * * * *